United States Patent
Ichikawa et al.

(10) Patent No.: US 7,338,118 B2
(45) Date of Patent: Mar. 4, 2008

(54) SEAT

(75) Inventors: Shingo Ichikawa, Fujisawa (JP); Masaharu Tanino, Toyota (JP); Masato Ohchi, Toyota (JP)

(73) Assignees: Shiroki Kogyo Co., Ltd., Fujisawa-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 10/577,420

(22) PCT Filed: Oct. 28, 2004

(86) PCT No.: PCT/JP2004/015986

§ 371 (c)(1),
(2), (4) Date: Mar. 6, 2007

(87) PCT Pub. No.: WO2005/042298

PCT Pub. Date: May 12, 2005

(65) Prior Publication Data

US 2007/0273193 A1    Nov. 29, 2007

(30) Foreign Application Priority Data

Oct. 30, 2003    (JP)    ............................. 2003-370517

(51) Int. Cl.
*B60N 2/42*    (2006.01)
(52) U.S. Cl. ............................. 297/216.1; 297/344.15; 297/216.2
(58) Field of Classification Search ............. 297/216.1, 297/216.16, 216.19, 216.2, 344.15, 344.17; 248/421, 422; 296/68.1, 65.05
See application file for complete search history.

(56) References Cited

U.S. PATENT DOCUMENTS 5,882,061 A * 3/1999 Guillouet ................. 296/65.05

(Continued)

FOREIGN PATENT DOCUMENTS

JP    56-14740    7/1954

(Continued)

*Primary Examiner*—Peter R. Brown
(74) *Attorney, Agent, or Firm*—Finnegan, Henderson, Farabow, Garrett & Dunner, L.L.P.

(57) ABSTRACT

A seat having a collision stopper (51) activated in a short time period in collision. The seat is constituted of a supporting link (23), a stopper link (55), a recess/ridge surface (61), a stopper (65), and urging means (67). The supporting link (23) is installed at its upper portion to the floor side and at its lower portion to the seat cushion side, supporting a seat cushion, and adjusts the height of the seat cushion by inclination in the forward and backward directions in the vertical plane. The stopper link (55) is attached at its base end section to the floor side such that a rotation end section is rotatable in the forward and backward directions in a vertical plane. The stopper link (55) has, on its rotation end section side, a projection (57) projecting sideward. The recess/ridge surface (61) is provided on the supporting link (23) side, extending in the direction intersecting the movement path of the projection. When engages with the projection upon receiving a collision load in an assumed direction, the recess/ridge surface (61) inhibits further rotation of the supporting link (23) by cooperating with the projection. The stopper (65) comes in contact with the projection at a position where the projection does not engages the recess/ridge surface (61), inhibiting the projection from further separating from the recess/ridge surface (61). The urging means (67) urges the stopper link (55) in the direction where the projection is in contact with the stopper.

4 Claims, 11 Drawing Sheets

U.S. PATENT DOCUMENTS

| | | | |
|---|---|---|---|
| 6,478,378 B2 * | 11/2002 | Muhlberger et al. | 297/344.12 |
| 6,505,888 B1 * | 1/2003 | Teufel et al. | 297/344.15 |
| 6,533,351 B2 * | 3/2003 | Deptolla | 297/216.2 |
| 6,572,065 B2 * | 6/2003 | Koga et al. | 248/421 |
| 6,659,548 B2 * | 12/2003 | Becker et al. | 297/216.1 |
| 6,733,075 B2 * | 5/2004 | Schumann et al. | 297/344.12 |
| 7,036,878 B2 * | 5/2006 | Masutani | 297/216.1 |
| 7,044,543 B2 * | 5/2006 | Schumann et al. | 297/216.1 |
| 7,077,471 B2 * | 7/2006 | Schumann et al. | 297/216.1 |
| 2003/0218369 A1 | 11/2003 | Akaike et al. | |

FOREIGN PATENT DOCUMENTS

| | | |
|---|---|---|
| JP | 62-299447 | 12/1987 |
| JP | 10-95261 | 4/1998 |
| JP | 2003-513850 | 4/2003 |
| JP | 2003-327030 | 11/2003 |
| JP | 2004-210030 | 7/2004 |

* cited by examiner

SEAT

TECHNICAL FIELD

The present invention relates to a seat having a height adjusting mechanism which adjusts the height of a seat cushion with respect to a floor and is constructed such that the seat cushion is supported by a support link attached to the floor side in its lower portion and attached to the seat cushion side in its upper portion, and the height of the seat cushion is adjusted by a tilting movement in the forward and backward directions within a perpendicular face of this support link.

BACKGROUND ART

A front support link and a rear support link for supporting the seat cushion are respectively arranged in a front portion and a rear portion of the outer side (window side) and the inner side (vehicle room inside) of the seat for a vehicle. These support links constitute one portion of the height adjusting mechanism.

The front support link and the rear support link are connected between a floor side member (link) and a seat side member (link), and constitute a four-joint rotating chain (link mechanism) together with the floor side member and the seat cushion side member.

Further, a driving mechanism portion for tilting a rear support link (a front support link can be also set) is assembled onto one of the outer side and the inner side (the outer side is set in the following explanation). The rotation of the rear support link of the outer side is transmitted to the link mechanism of the inner side through a transmission rod so that the operations of the link mechanisms on both the sides are synchronized.

Namely, the link mechanism of the outer side of the seat is directly operated by the driving mechanism portion. The link mechanism of the inner side is operated by following the link mechanism of the outer side through the transmission rod.

At a time of collision of the vehicle, a colliding load (inertia force) applied to the seat is transmitted from the seat cushion side to the front support link and the rear support link of the link mechanism on the outer side and the inner side.

At this time, in the link mechanism of the outer side assembling the driving mechanism portion thereinto, the driving mechanism portion supports the colliding load so that the rotations of the front support link and the rear support link can be prevented. However, in the link mechanism of the inner side, the colliding load is applied as force for twisting the transmission rod. Accordingly, the transmission rod is twisted and the front support link and the rear support link are correspondingly rotated.

Therefore, when the vehicle collides forward (forward collision) and a large colliding load is applied to the seat, the front support link and the rear support link are rotated forward in the link mechanism of the inner side, and the seat cushion is projected forward. Conversely, when the vehicle collides backward (backward collision), the seat cushion is sunk backward.

It is known that a colliding stopper is arranged in the link mechanism of the inner side to prevent such a movement of the seat cushion. The colliding stopper shown in FIGS. 1 and 2 has teeth attaching segments (engaged members) 101, 102 forming plural teeth arranged on the seat cushion side, and a claw lever (engaging member) 104 rotatably arranged in a support link 103 and having teeth able to be engaged with the teeth of the teeth attaching segments 101, 102. The colliding stopper further has a lock hole 105 and a lock spring 106 for biasing the claw lever 104 in the direction of the lock hole 105. The lock hole 105 is formed on the side of the support link 103, and is engaged with the claw lever 104, and inhibits the further rotation of a direction separated from the teeth attaching segments 101, 102 of the claw lever 104 in a position in which no teeth of the claw lever 104 are engaged with the teeth of the teeth attaching segments 101, 102.

When the colliding load is applied to the seat, the claw lever 104 is rotated against the biasing force of the lock spring 106 by inertia, and is engaged with the teeth attaching segments 101, 102. The rotation of the support link 103 is inhibited by this engagement of the claw lever 104 and the teeth attaching segments 101, 102, and the movement of the seat cushion is also inhibited.

Patent literature 1: JP-T-2003-513850

DISCLOSURE OF THE INVENTION

Problems that the Invention is to Solve

In the conventional seat, when the colliding load is applied, the movement of the seat cushion is inhibited by engaging the teeth of the engaging member with the teeth of the engaged member.

In this construction, in a state in which no colliding load is applied to the seat, the teeth of the engaging member must be perfectly separated from plural teeth of the engaged member so as not to obstruct the rotation of the support link.

In the case of the conventional construction in which the teeth of the engaging member and the engaged member are engaged with each other, a predetermined height of the teeth is required. Accordingly, an escaping distance of the engaging member from the engaged member is large in a state in which no colliding load is applied to the seat. In addition, in the conventional construction, no positioning accuracy in the escaping position of the engaging member can be highly set. Therefore, it is correspondingly necessary to largely set the escaping distance of the engaging member from the engaged member.

Accordingly, at the time of collision of the vehicle, it takes time until the teeth of the engaging member are perfectly engaged with the teeth of the engaged member. Therefore, a problem exists in that the moving amount of the seat cushion is increased.

In consideration of the above problems, an object of the present invention is to provide a seat able to reduce the moving amount of the seat cushion at the time of collision of the vehicle.

Means for Solving the Problems

The invention according to claim 1 for solving the above problems resides in a seat having a height adjusting mechanism for adjusting the height of a seat cushion with respect to a floor, and comprising a support link for supporting the seat cushion by attaching its lower portion to the floor side and attaching its upper portion to the seat cushion side, and adjusting the height of the seat cushion by a tilting movement in the forward and backward directions within a perpendicular face; a stopper link in which a base end portion is attached to the floor side so as to rotate a rotating end portion in the forward and backward directions within the perpendicular face, and a projection projected on the side is arranged on the rotating end portion side; an irregular face arranged on the support link side so as to be extended in a direction crossing a moving locus of the projection, and inhibiting further rotation of the support link in cooperation with the projection when the irregular face is engaged with the projection by receiving a colliding load of a supposing direction; a stopper abutting on the projection in a position of the projection not engaged with the irregular face, and inhibiting that the projection is separated from the irregular face any more; and biasing means for biasing the stopper link in a direction in which the projection abuts on the stopper.

The projection of the stopper link normally abuts on the stopper by biasing force of the biasing means. Accordingly, no rotation of the support link is obstructed. When the colliding load of the supposing direction is applied to the seat, the irregular face is engaged with the projection of the stopper link, and inhibits the further rotation of the support link in cooperation with this projection.

In the seat described in claim 1, the invention according to claim 2 is characterized in that irregularities are arranged in an arc shape on the irregular face so as to surround respective rotation centers of the support link and the stopper link on the inside, and the stopper link is rotated so as to make the projection approach the irregular face, and is engaged with a concave face near the irregular face thereon when the colliding load of the supposing direction is received.

In the seat described in claim 1 or 2, the invention according to claim 3 is characterized in that irregularities are arranged in an arc shape on the irregular face so as to surround respective rotation centers of the support link and the stopper link on the inside, and this arc shape pattern is set to a pattern for making the irregular face approach the projection in the rotation by receiving the colliding load of the supposing direction.

In the seat described in claim 1, 2 or 3, the invention according to claim 4 is characterized in that a long groove extending in the direction crossing the moving locus of the projection is formed in the support link, and one of two opposed inner wall side faces of this long groove is set to the irregular face, and the other inner wall side face is set to the stopper.

ADVANTAGE OF THE INVENTION

In accordance with the invention according to claim 1, the rotation of the link is inhibited by the engagement of the projection and the irregular face, and positioning in an escaping position of the projection is performed by abutting of the projection and the stopper. Accordingly, positioning accuracy can be raised, and the escaping distance of the projection from the irregular face can be shortened. Accordingly, it is possible to realize a seat able to reduce the moving amount of the seat cushion at the colliding time of a vehicle.

In accordance with the inventions according to claims 2 and 3, the projection and the irregular face can be further rapidly engaged. Thus, the moving amount of the seat cushion can be further reduced at the time of collision of the vehicle.

In accordance with the invention according to claim 4, it is not necessary to arrange the irregular face and the stopper separately from the support link so that the number of parts can be reduced.

DESCRIPTION OF THE REFERENCE NUMERALS AND SIGNS

Figure 1:
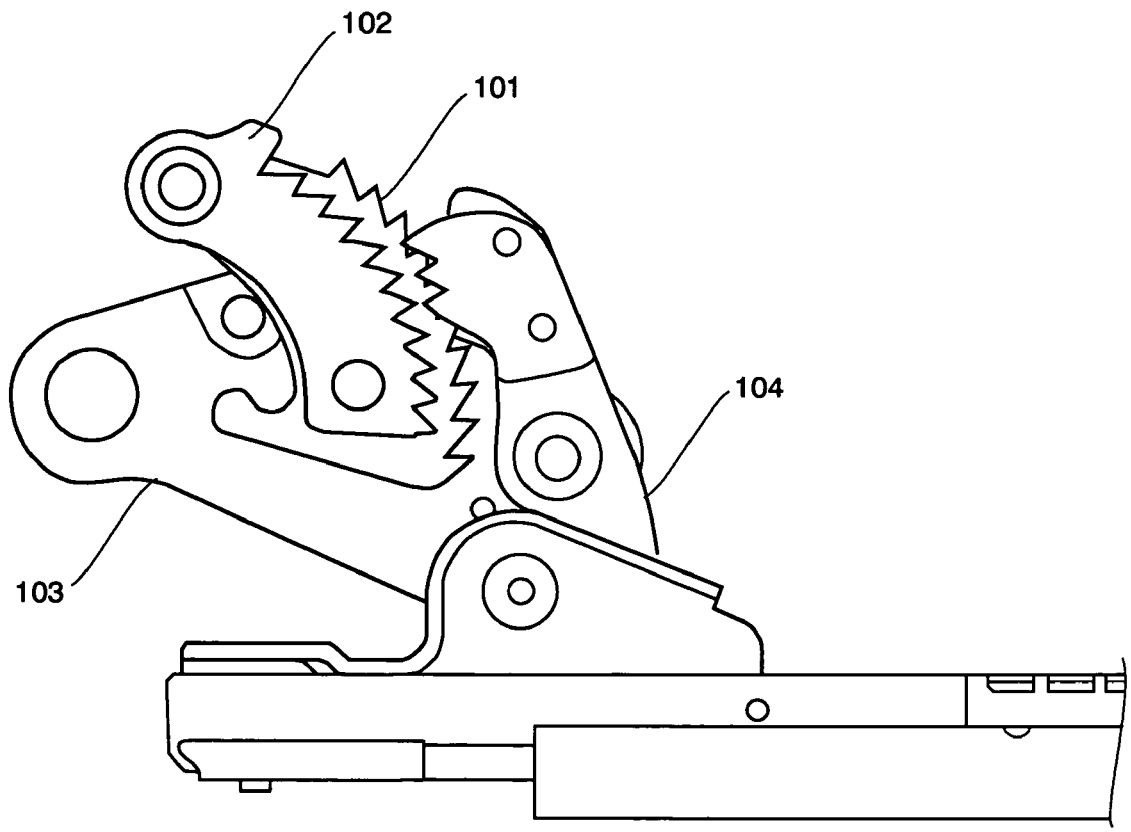
FIG. 1 is a view showing the main construction of a colliding stopper used in a conventional seat.
Figure 2:
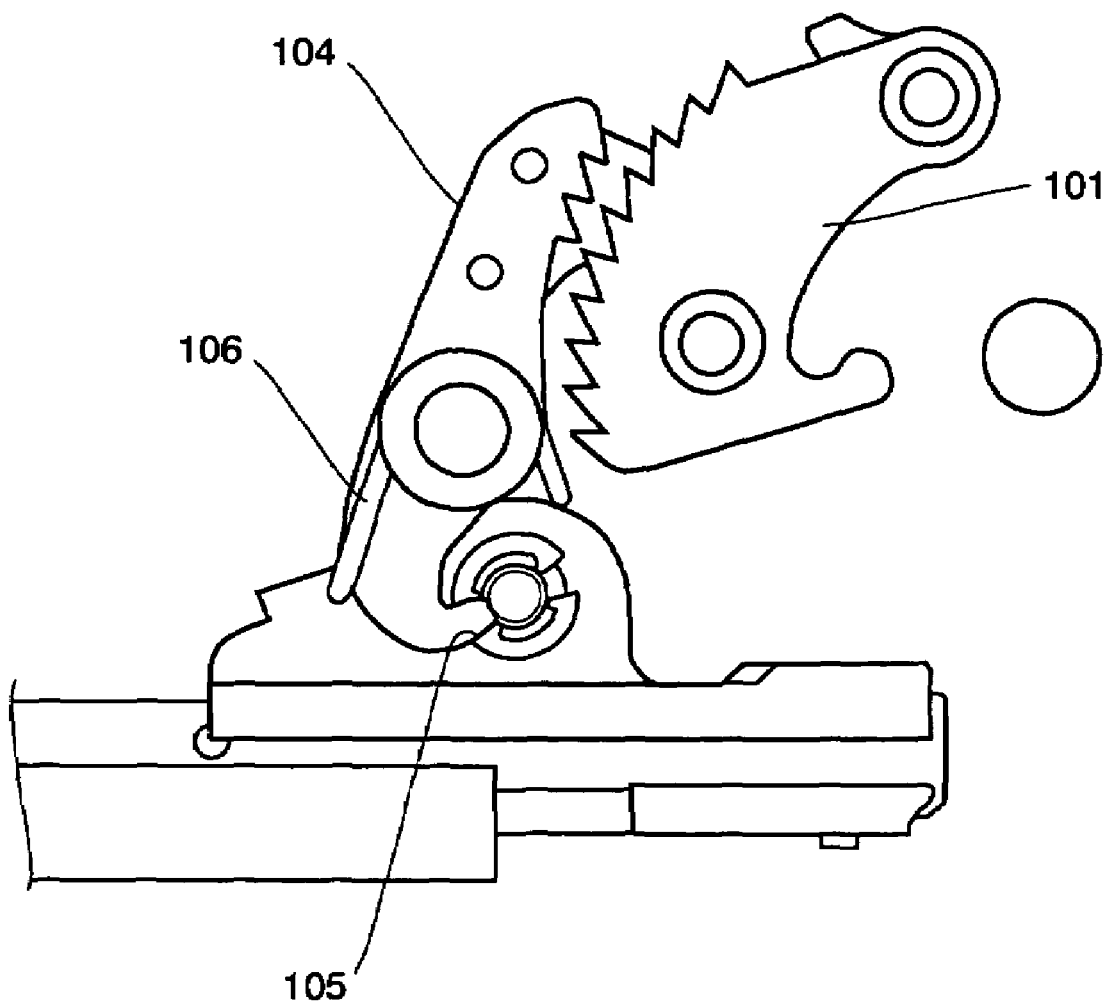
FIG. 2 is a view of the main construction in which the colliding stopper of FIG. 1 is seen from the rear side.
Figure 3:
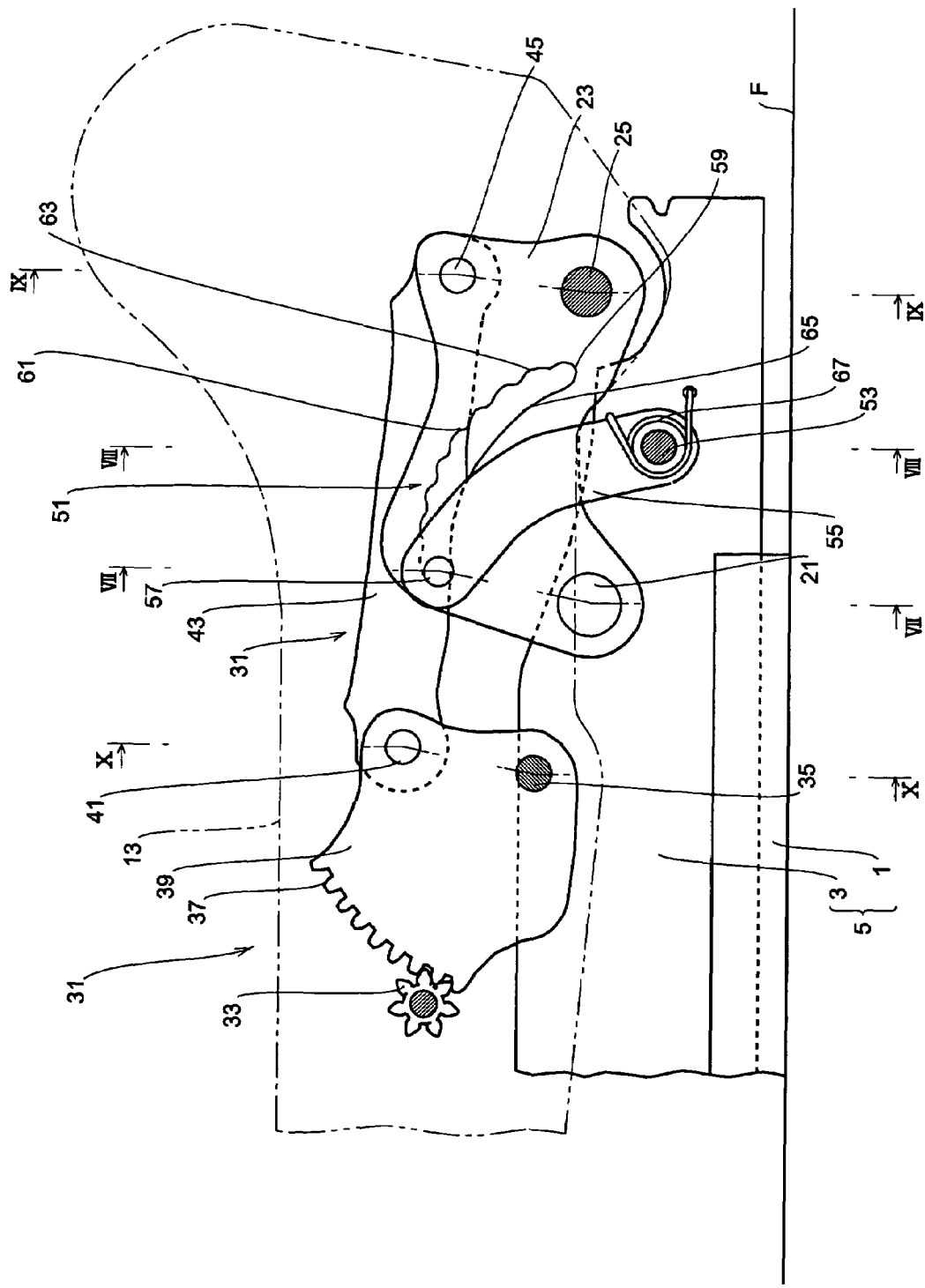
FIG. 3 is a view showing an invention portion of a mode example, and is also an enlarged view of the vicinity of a rear support link in which a lower arm being removed therefrom in FIG. 5.
Figure 4:
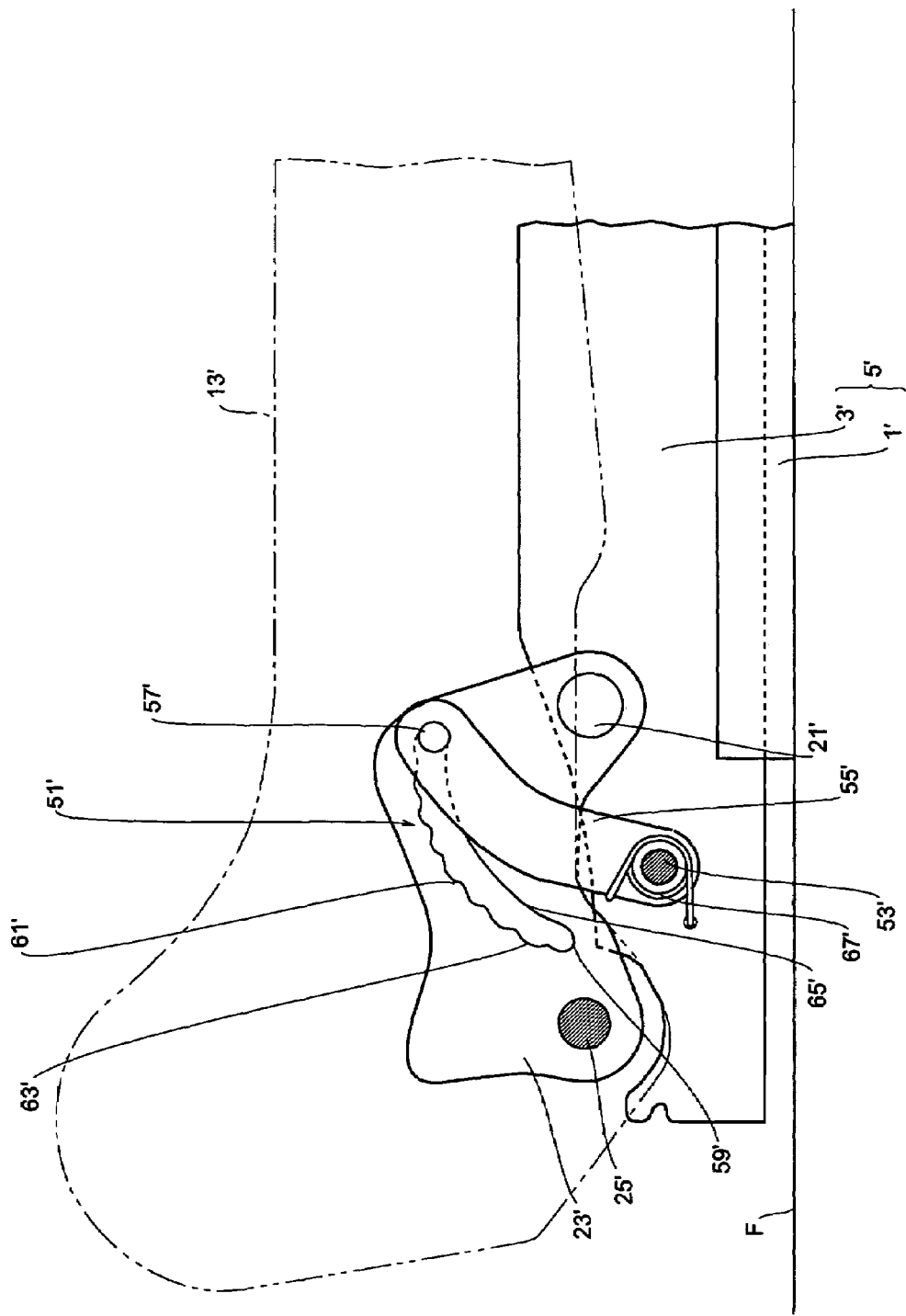
FIG. 4 is a view showing the invention portion of the mode example, and is also an enlarged view of the vicinity of the rear support link in which the lower arm being removed therefrom in FIG. 6.

23 rear support link (support link)
51 colliding stopper
55 stopper link
57 pin (projection)
59 long groove
61 irregular face
63 first inner wall side face
65 second inner wall side face (stopper)
67 spring (biasing means)

BEST MODE FOR CARRYING OUT THE INVENTION

Figure 5:
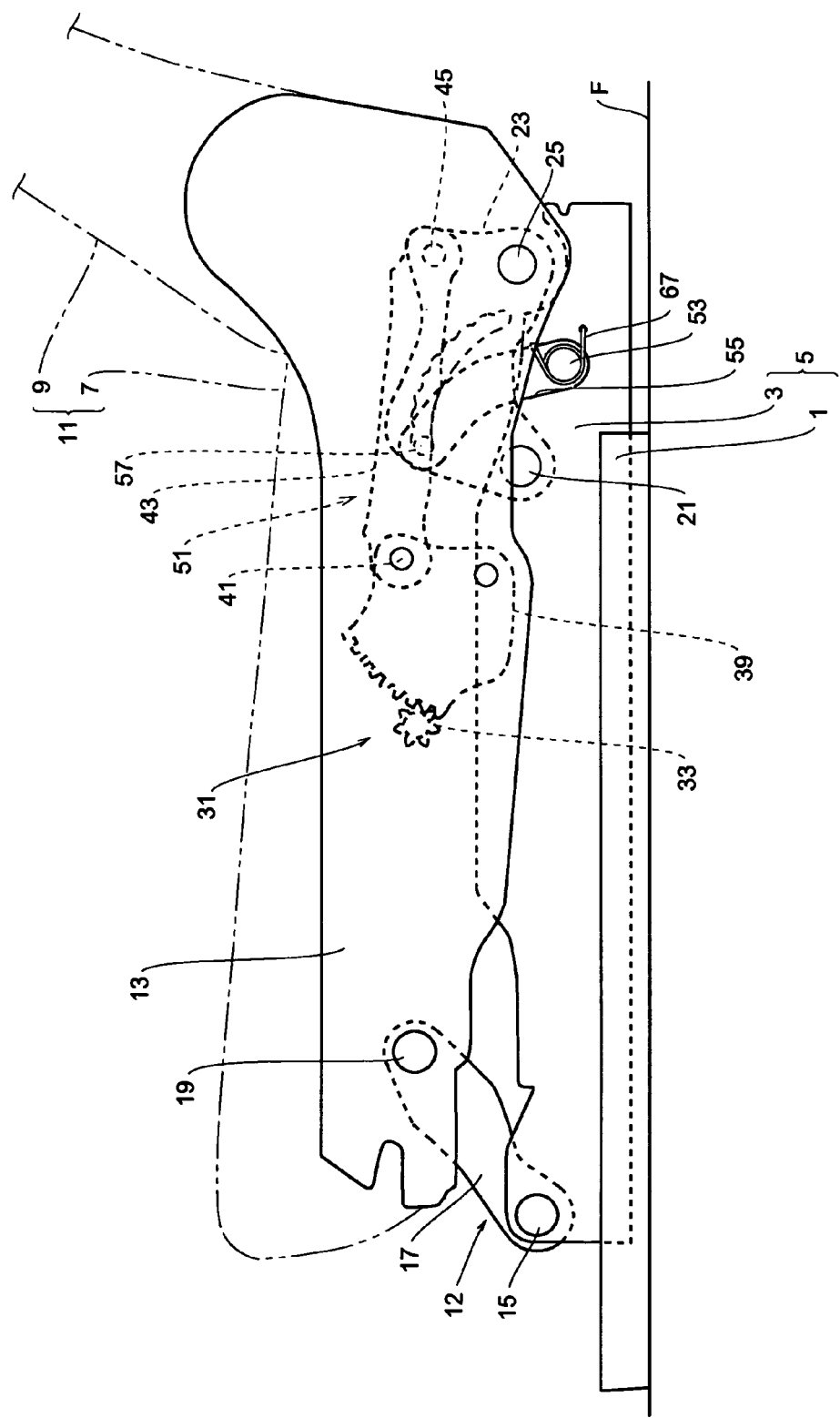
FIG. 5 is a view showing a seat side face of the outer side of the mode example.

Best modes for embodying the present invention will next be explained by using the drawings. First, the entire construction of a seat will be explained by using FIG. 5.

The seat of this mode example is mainly constructed by a seat main body 11 and a height adjusting mechanism 12 for adjusting the height of the seat main body 11 from a floor F. This seat is attached onto a seat track 5 for adjusting the position of the seat in the forward and backward directions. The seat main body 11 is constructed by a seat cushion 7 for supporting a buttock portion of a seating person and a seat back 9 for supporting a back portion of the seating person.

The seat track 5 is constructed by a lower rail 1 arranged in the floor F, an upper rail 3 movably engaged with this lower rail 1, and an unillustrated lock mechanism for inhibiting the movement of the upper rail 3. The seat can be adjusted to a predetermined desirable position of the forward and backward directions by releasing the lock of the lock mechanism and moving the upper rail 3 with respect to the lower rail 1.

Next, the height adjusting mechanism 12 will be explained. A lower arm 13 as a frame of the seat cushion 7 is arranged in the seat cushion 7. One end portion side of a front support link 17 is rotatably attached to the front portion of the upper rail 3 of the seat track 5 by using a pin 15. The other end portion side of this front support link 17 is rotatably attached to the front portion of the lower arm 13 by using a pin 19.

One end portion side of a rear support link 23 is rotatably attached to the rear portion of the upper rail 3 of the seat track 5 by using a pin 21. An intermediate portion of this rear support link 23 is rotatably attached to the rear portion of the lower arm 13 by using a pin 25. Accordingly, a four-joint rotating chain is formed by the upper rail 3 of the seat track 5, the front support link 17, the lower arm 13 of the seat cushion 7, and the rear support link 23. The lower arm 13, i.e., the seat main body 11 is raised and lowered with respect to the floor F by tilting one of the front support link 17 and the rear support link 23 in the forward and backward directions. In this mode example, the rear support link 23 is rotated by using a driving mechanism portion 31.

Here, the driving mechanism portion 31 will be explained by using FIGS. 3 and 7 to 10. A pinion 33 rotated and operated by an unillustrated driving means is arranged in the lower arm 13. The pinion 33 may be rotated and operated manually or electrically. In the manual case, a brake mechanism is arranged between the pinion 33 and an operating portion.

This brake mechanism permits the rotation and operation of the pinion 33 from the operating portion, and reversely inhibits that the pinion 33 is rotated by force applied from the side of a sector gear 39 to the pinion 33. For example, this brake mechanism is widely used in a window regulator of a manual type. On the other hand, in the case of a construction for electrically rotating and operating the pinion 33, the pinion 33 is rotated and operated by a motor through a speed reduction mechanism having a large speed reduction ratio and constructed by e.g., a worm and a worm wheel.

The sector gear 39 is rotatably arranged by using a pin 35, and is engaged with the pinion 33 in a teeth portion 37. One end portion of a transmission link 43 is rotatably attached to the sector gear 39 by using a pin 41. The position of the pin 41 is a position different from that of the pin 35 as a rotation center of the sector gear 39. The other end portion of this transmission link 43 is rotatably attached to the other end portion side of the rear support link 23 by using a pin 45.

When the pinion 33 of the driving mechanism portion 31 is rotated, the sector gear 39 is rotated with the pin 35 as a center. The rotation of the sector gear 39 is transmitted to the rear support link 23 through the transmission link 43, and the rear support link 23 is rotated with the pin 21 as a center. The lower arm 13 (seat main body 11) is raised and lowered with respect to the floor F by this rotation of the rear support link 23.

Figure 6:
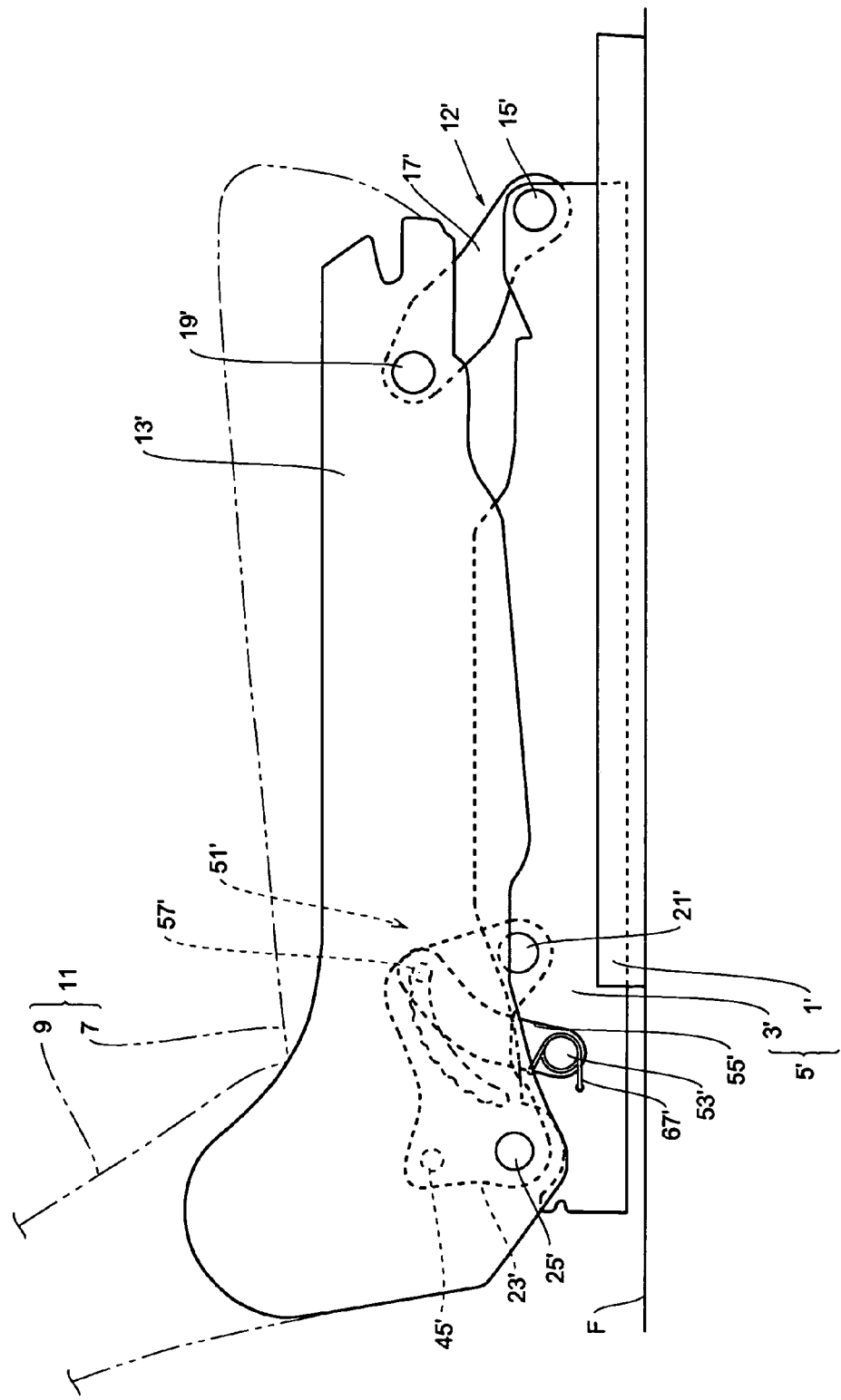
FIG. 6 is a view showing a seat side face of the inner side of the mode example.

Next, the inner side of the seat will be explained by using FIG. 6. The difference point between the outer side and the inner side is that the driving mechanism portion for operating the height adjusting mechanism is arranged on the outer side, and no driving mechanism portion is arranged on the inner side. Since the other portions have a symmetrical structure, a part corresponding to the outer side on the inner side is designated by a reference numeral provided by adding '(dash) to the reference numeral of the part on the outer side, and an overlapping explanation is omitted.

Next, colliding stoppers arranged on the outer side and the inner side will be explained by using FIGS. 3, 4 and 7 to 10. The colliding stopper of the inner side has a structure symmetrical with respect to the colliding stopper of the outer side, and is therefore explained by using the colliding stopper 51 of the outer side. A part corresponding to the outer side on the inner side is designated by a reference numeral provided by adding '(dash) to the reference numeral of the part of the outer side, and an overlapping explanation is omitted.

A stopper link 55 is rotatably attached to the upper rail 3 (floor F side) of the seat track 5 by using a pin 53. A pin 57 extended approximately in parallel with the floor F is arranged on the side of a rotating end portion of this stopper link 55 as a projection projected on the side. On the other hand, a long groove 59 is formed in the rear support link 23. This long groove 59 is extended in a direction crossing a moving locus of the pin 57 of the stopper link 55. An irregular face 61 is formed on a first inner wall side face 63 as one of two opposed inner wall side faces of the long groove 59, and inhibits the rotation in one direction of the rear support link 23 (a lowering direction of the seat main body 11 in this mode example) when the pin 57 of the stopper link 55 is engaged with the irregular face 61.

Plural irregularities are arranged on the irregular face 61 so as to be arrayed in an arc shape (which is no accurate arc in this mode example) such that the respective rotation centers of the rear support link 23 and the stopper link 55 are surrounded on the inner side. This arc shape pattern is set to a pattern in which the irregular face 61 approaches the pin 57 when the rotation is performed by receiving the colliding load (rear collision in this mode example) of a supposing direction.

When the colliding load of the supposing direction is applied to the seat, the stopper link 55 is rotated so as to make the pin 57 approach the irregular face 61, and is engaged with a concave face near the irregular face 61 thereon. The shape of the concave face on this irregular face 61 is formed by an arc of a diameter larger than the radius of the pin 57. However, it is not necessary to set an accurate arc and it is also not necessary to limit this shape to the arc. In short, in a state in which the irregular face 61 and the pin 57 come in contact with each other and press against each other, it is sufficient to set this shape to a shape in which rotation moment of the clockwise direction in FIG. 11(c) is applied from the contact face to the stopper link 55, or a contact angle for attaining a state compressed without receiving the rotation moment of any direction is obtained.

With respect to the two opposed inner wall side faces of the long groove 59, the second inner wall side face 65 as the other inner wall side face is set to a flat arc shape face. When the pin 57 of the stopper link 55 abuts on this second inner wall side face 65, the second inner wall side face 65 functions as a stopper for inhibiting that a pin 58 of the stopper link 55 is separated from the irregular face 61 any more in a position for engaging no pin 57 of the stopper link 55 with the irregular face 61.

With respect to a spring (biasing means) 67, an intermediate portion thereof winds the pin 53 of the stopper link 55 therearound, and one end portion thereof is engaged with the upper rail 3 of the seat track 5, and the other end portion thereof is engaged with the stopper link 55. The stopper link 55 is biased by this spring 67 in a direction in which the pin 57 abuts on the second inner wall side face 65 of the long groove 59.

Figure 9:
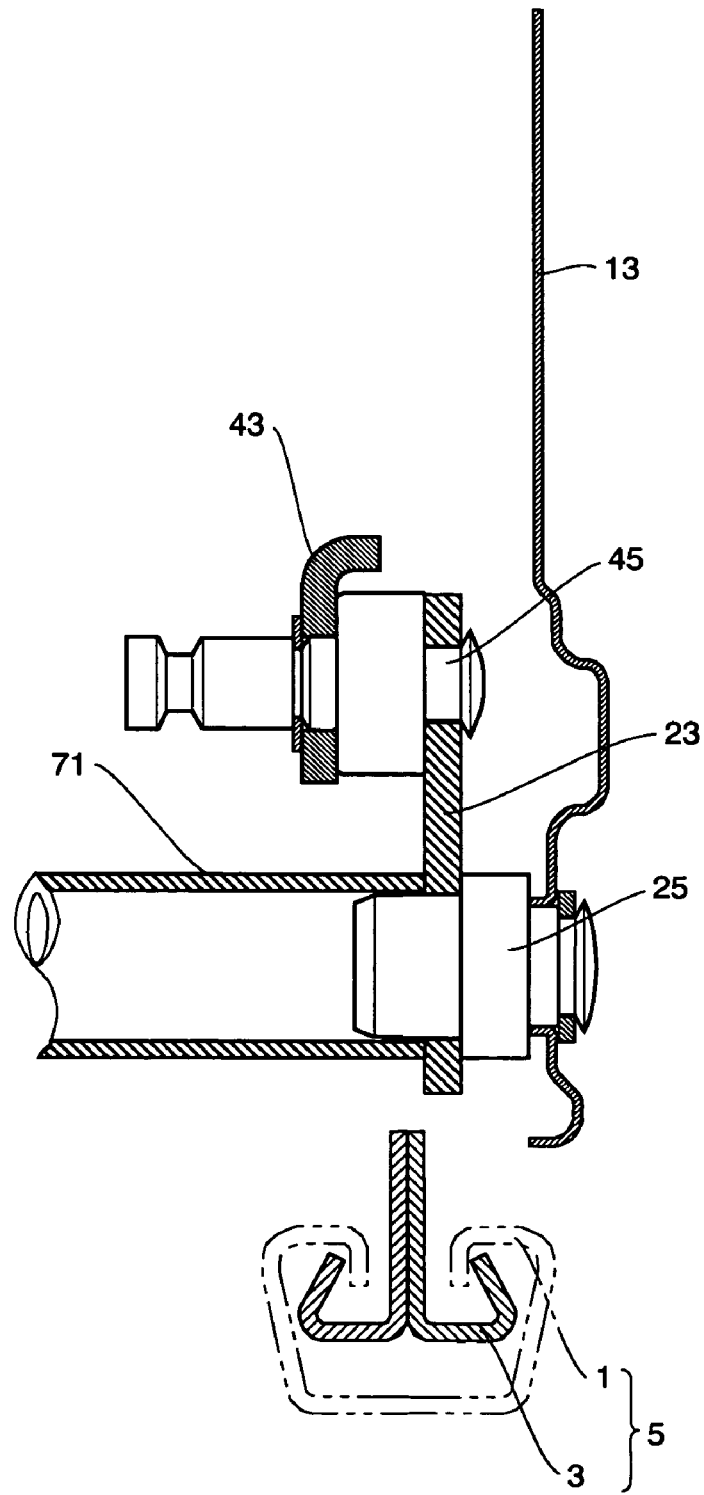
FIG. 9 is a cross-sectional view on a cutting line IX-IX of FIG. 3.
Figure 10:
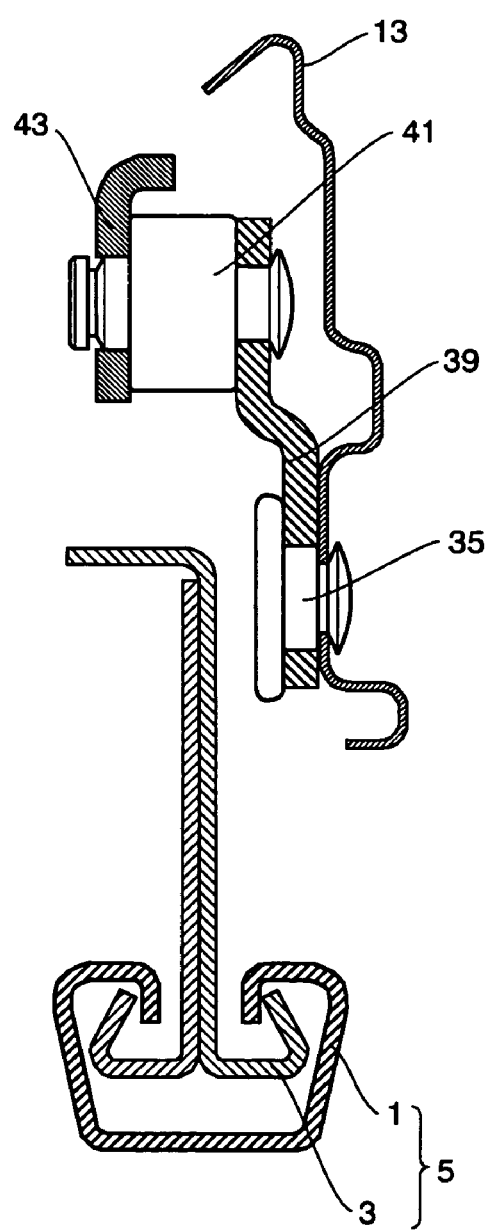
FIG. 10 is a cross-sectional view on a cutting line X-X of FIG. 3.

Further, as shown in FIG. 9, a sleeve-shaped transmission rod 71 has both ends setting to opening faces, and one opening face of the sleeve-shaped transmission rod 71 is rotatably fitted to the pin 25. The other side opening face of the transmission rod 71 is rotatably fitted to a pin 25' of a seat track 5' of the inner side. Further, one end portion of the transmission rod 71 is fixedly attached to the rear support link 23 of the seat track 5 of the outer side. Similarly, the other end portion of the transmission rod 71 is fixedly attached to a rear support link 23' of the seat track 5' of the inner side. Accordingly, a movement of the rear support link 23 of the outer side is transmitted to the rear support link 23' of the inner side through the transmission rod 71.

Figure 7:
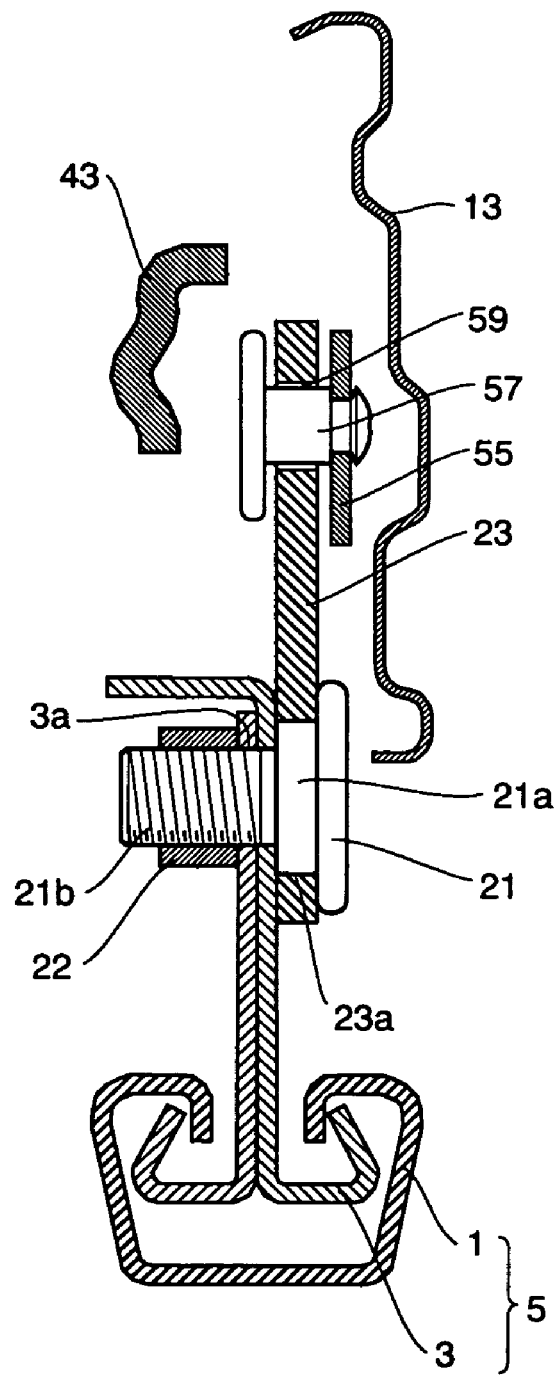
FIG. 7 is a cross-sectional view on a cutting line VII-VII of FIG. 3.

Further, as shown in FIG. 7, a neck portion of the pin 21 is constructed by a large diameter portion 21a and a small diameter portion 21b forming a male screw on its circumferential face. The large diameter portion 21a of the pin 21 is inserted into a hole 23a formed in the rear support link 23. The small diameter portion 21b of the pin 21 is inserted into a hole 3a formed in the upper rail 3. The rear support link 23 is rotatably attached to the upper rail 3 by screwing the small diameter portion 21b into a nut 22.

Figure 8:
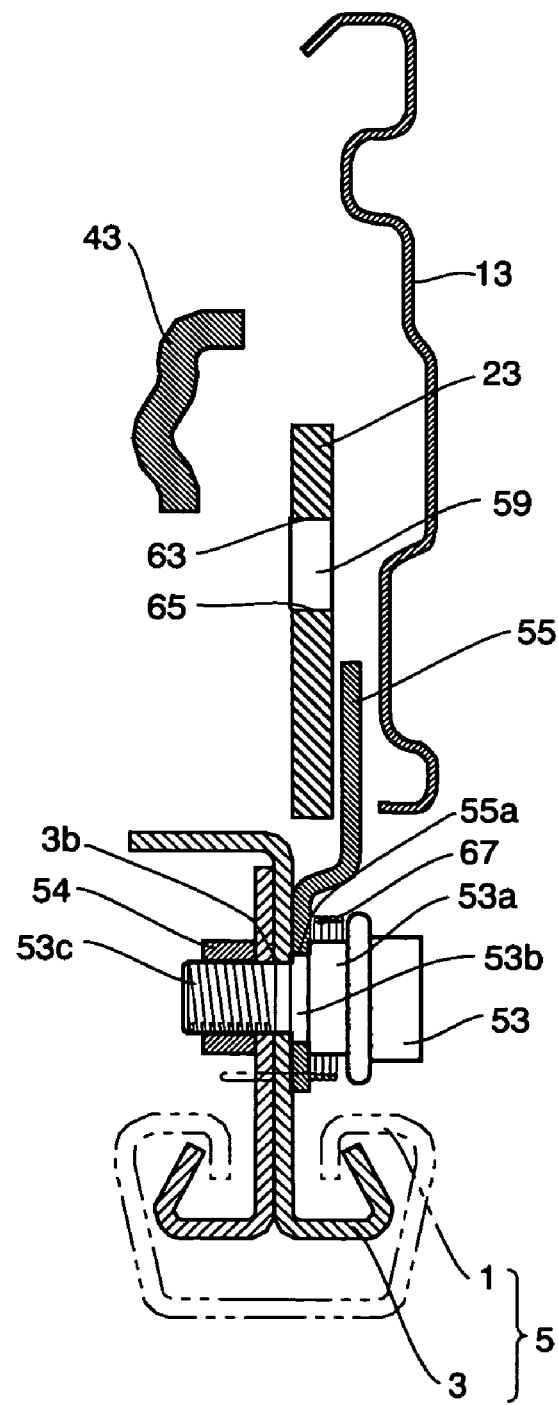
FIG. 8 is a cross-sectional view on a cutting line VIII-VIII of FIG. 3.

Further, as shown in FIG. 8, a neck portion of the pin 53 is constructed by a large diameter portion 53a, an intermediate diameter portion 53b and a small diameter portion 53c forming a male screw on its circumferential face. The intermediate diameter portion 53b of the pin 53 is inserted into a hole 55a formed in the stopper link 55. The small diameter portion 53c of the pin 53 is inserted into a hole 3b of the upper rail 3. The stopper link 55 is rotatably attached to the lower rail 3 by screwing the small diameter portion 53c into a nut 54. Further, an intermediate portion of the spring 67 is wound around the large diameter portion 53a of the pin 53.

Figure 11:
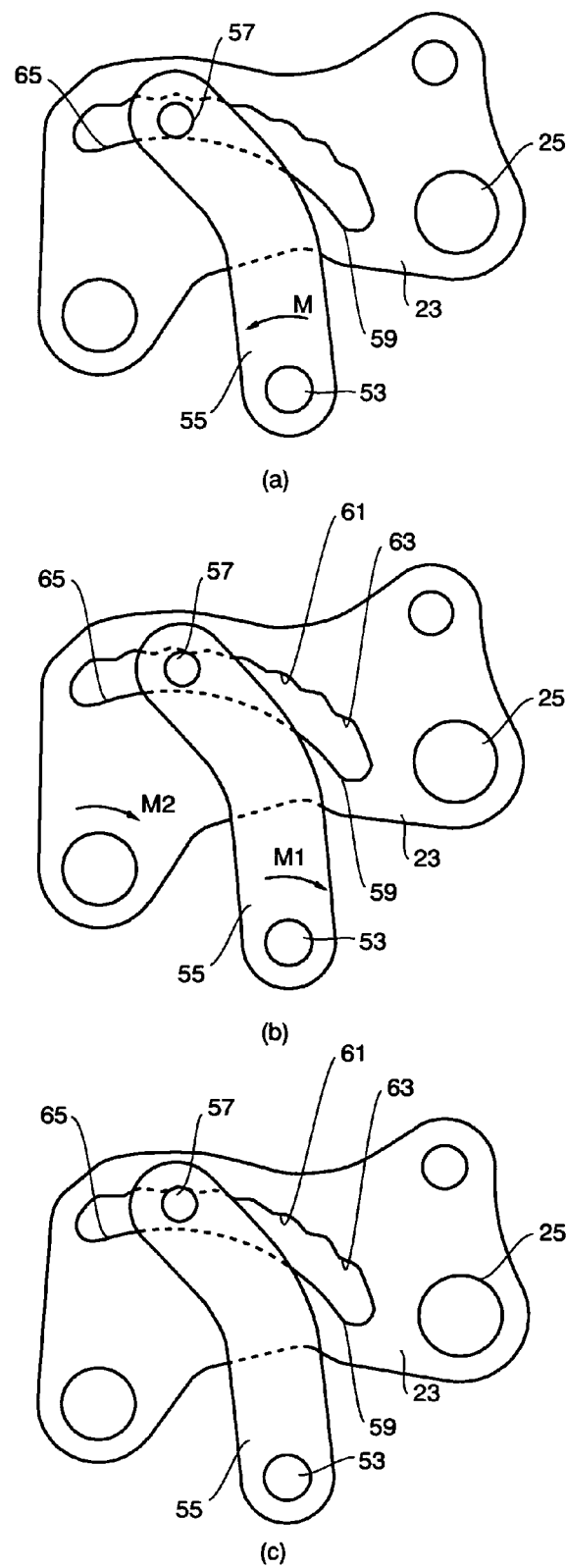
FIG. 11 is a view for explaining the operation of a colliding stopper.

Here, the operation of the colliding stopper 51 (colliding stopper 51') will be explained by using FIG. 11.

As shown in FIG. 11(a), the pin 57 of the stopper link 55 normally abuts on the second inner wall side face 65 of the long groove 59 of the rear support link 23 by the biasing force (the direction of an arrow M) of the spring (biasing means) 67. Accordingly, even when the rear support link 23 is rotated, the pin 57 of the stopper link 55 comes in slide contact with the flat second inner wall side face 65 of the long groove 59 of the rear support link 23 thereon, and does not obstruct the rotation of the rear support link 23.

When the vehicle collides (a rear collision in this mode example), the seat main body 11 intends to be sunk backward. In this case, as shown in FIG. 11(b), moment M2 is generated by inertia in the rear support link 23. On the other hand, moment M1 is generated in the stopper link 55, and the stopper link 55 is rotated against the biasing force of the spring 67. Since the long groove 59 extends in a direction crossing a moving locus of the pin 53 of the stopper link 55, the pin 57 of the stopper link 55 abuts on the first inner wall side face 63 of the long groove 59.

As shown in FIG. 11(c), the pin 57 of the stopper link 55 is engaged with the irregular face 61 of the first inner wall side face 63 of the long groove 59. A contact state of the irregular face 61 and the pin 57 in this case will be explained. The pin 57 attains a state in which the pin 57 comes in contact with the concave face near the irregular face 61 thereon, and the pin 57 and this concave face press against each other. At least, the stopper link 55 attains a state in which rotation moment of the clockwise direction in FIG. 11(c) is applied from the contact face to the stopper link 55, or no rotation moment of any direction is applied from the contact face to the stopper link 55 (the concave face of the irregular face 61 is formed in a shape for obtaining such a contact angle). Accordingly, the rotation in a direction intended to backwards sink the seat main body 11 (seat cushion) of the rear support link 23 is inhibited.

Thus, in this mode example, the rotation of the rear support link 23 is inhibited by the engagement of the pin 57 and the irregular face 61. Further, positioning in an escaping position of the pin 57 is performed by abutting of the pin 57 and the second inner wall side face 65. Accordingly, positioning accuracy can be raised, and the escaping distance of the pin 57 from the irregular face 61 can be shortened. Accordingly, the moving amount of the seat cushion 7 can be reduced at the time of collision of the vehicle.

Further, in accordance with the above mode example, plural irregularities are arranged on the irregular face 61 so as to be arrayed in an arc shape such that the respective rotation centers of the rear support link 23 and the stopper link 55 are surrounded on the inside. This arc shape pattern is set to a pattern in which the irregular face 61 approaches the pin 57 when the rotation is performed by receiving the colliding load of a supposing direction. At the time of collision of the vehicle, the stopper link 55 is rotated such that the pin 57 approaches the irregular face 61, and this stopper link 55 is engaged with the concave face near the irregular face 61 thereon. Therefore, the pin 57 and the irregular face 61 can be more rapidly engaged, and the moving amount of the seat cushion 7 can be further reduced at the time of collision of the vehicle.

Further, when the pin 57 of the stopper link 55 abuts on the second inner wall side face 65 of the long groove 59, the second inner wall side face 65 functions as a stopper for inhibiting that the pin 58 of the stopper link 55 is separated from the irregular face 61 any more in a position for engaging no pin 57 of the stopper link 55 with the irregular face 61. Accordingly, it is not necessary to separately arrange the stopper so that the number of parts is reduced.

In the above mode example, the colliding stopper 51 of the outer side and the colliding stopper 51' of the inner side are arranged. However, the colliding stopper 51' of the inner side in which arranges no driving mechanism portion 31 is indispensable, but no colliding stopper 51 of the outer side may be arranged.

Further, in the above mode example, the explanation is made by the colliding stopper 51 and the colliding stopper 51' with respect to the backward collision. However, the present invention can be also applied to a stopper with respect to the forward collision. Further, the colliding stoppers 51, 51' are arranged in the rear support links 23, 23', but may be also arranged on the front support link side.

Further, in the above mode example, the long grooves 59, 59' are arranged, and the irregular faces 61, 61' are formed on their first inner wall side faces 63, 63', and the second inner wall side face 65, 65' are set to stoppers. However, members having the irregular face may be attached to the rear support links 23, 23' without arranging such long grooves 59, 59', and stoppers may be also separately arranged in the upper rails 3, 3' of the seat tracks 5, 5' or the rear support links 23, 23'.

The invention claimed is:

1. A seat having a height adjusting mechanism for adjusting height of a seat cushion with respect to a floor, and comprising a support link for supporting said seat cushion by attaching a lower portion to the floor side and attaching an upper portion to the seat cushion side, and adjusting the height of said seat cushion by a tilting movement in the forward and backward directions within a perpendicular face; a stopper link in which a base end portion is attached to said floor side so as to rotate a rotating end portion in the forward and backward directions within the perpendicular face, and a projection projected on the side is arranged on said rotating end portion side; an irregular face arranged on said support link side so as to be extended in a direction crossing a moving locus of said projection, and inhibiting further rotation of said support link in cooperation with said projection when the irregular face is engaged with said projection by receiving a colliding load of a supposing direction; a stopper abutting on said projection in a position of said projection not engaged with said irregular face, and inhibiting that said projection is separated from said irregular face any more; and biasing means for biasing said stopper link in a direction in which said projection abuts on said stopper.

2. The seat according to claim 1, wherein irregularities are arranged in an arc shape on said irregular face so as to surround respective rotation centers of said support link and said stopper link on the inside, and said stopper link is rotated so as to make said projection approach said irregular face, and is engaged with a concave face near said irregular face thereon when the colliding load of the supposing direction is received.

3. The seat according claim 1 or 2, wherein irregularities are arranged in an arc shape on said irregular face so as to surround respective rotation centers of said support link and said stopper link on the inside, and this arc shape pattern is set to a pattern for making said irregular face approach said projection in the rotation by receiving the colliding load of the supposing direction.

4. The seat according to claim 1 or 2, wherein a long groove extending in the direction crossing the moving locus of said pin is formed in said support link, and one of two opposed inner wall side faces of this long groove is set to said irregular face, and the other inner wall side face is set to said stopper.

* * * * *